United States Patent
Tanaka

(10) Patent No.: US 9,594,365 B2
(45) Date of Patent: Mar. 14, 2017

(54) COOPERATIVE OPERATING DEVICE AND METHOD

(71) Applicant: Azbil Corporation, Tokyo (JP)

(72) Inventor: Masato Tanaka, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 481 days.

(21) Appl. No.: 14/162,939

(22) Filed: Jan. 24, 2014

(65) Prior Publication Data

US 2014/0214180 A1    Jul. 31, 2014

(30) Foreign Application Priority Data

Jan. 25, 2013  (JP) .................................. 2013-011870

(51) Int. Cl.
   *G05B 19/042*      (2006.01)
(52) U.S. Cl.
   CPC ................................ *G05B 19/0421* (2013.01)
(58) Field of Classification Search
   CPC ................................................ G05B 19/0421
   See application file for complete search history.

(56) References Cited

U.S. PATENT DOCUMENTS

| | | | | |
|---|---|---|---|---|
| 5,357,421 A | * | 10/1994 | Tautz | B21B 37/54 360/69 |
| 5,640,002 A | * | 6/1997 | Ruppert | G06K 7/0008 235/383 |
| 5,952,582 A | * | 9/1999 | Akita | G01N 3/32 73/805 |

FOREIGN PATENT DOCUMENTS

| | | | |
|---|---|---|---|
| JP | 2002-48378 A | 2/2002 | |
| JP | 3805957 B2 * | 8/2006 | .......... F24F 11/0008 |

OTHER PUBLICATIONS

K.K. Tan, T.H. Lee, R. Ferdous, "Simultaneous online automatic tuning of cascade control for open loop stable processes", ISA Transactions 39 (2000) 233-242.*

Antonio Visioli and Aurelio Piazzi, "An automatic tuning method for cascade control systems", Proceedings of the 2006 IEEE International Conference on Control Applications, Munich, Germany, Oct. 4-6, 2006.*

* cited by examiner

*Primary Examiner* — Kenneth M Lo
*Assistant Examiner* — David Wynne
(74) *Attorney, Agent, or Firm* — Troutman Sanders LLP

(57) ABSTRACT

A cooperative operating device includes primary controlling units that are provided for individual primary control systems, and calculate operating variables and outputting them to the actuators of the corresponding primary control systems, a selector that combines operating variables by performing a weighting calculation on the operating variables calculated by the primary controlling units, and an operating variable adjustment controlling unit that is provided to correspond to a single secondary control system for controlling an equilibrium point that is a desirable operating variable output with the primary control in a steady-state, inputs a specific operating variable setting value that indicates the equilibrium point, and inputs, as a controlled variable input, the operating variable after combination, outputted from the selector, to calculate an adjustment operating variable and output it to the actuator of the secondary control system.

16 Claims, 12 Drawing Sheets

Background Art

Background Art

Background Art

COOPERATIVE OPERATING DEVICE AND METHOD

CROSS REFERENCE TO RELATED APPLICATION

This application claims priority under 35 U.S.C. §119 to Japanese Patent Application No. 2013-011870, filed on Jan. 25, 2013, the entire content of which being hereby incorporated herein by reference.

FIELD OF TECHNOLOGY

The present invention relates to a cooperative operating device and method able to achieve energy conservation in a multi-loop control system that has a plurality of primary control systems for the purpose of primary control and only a single secondary control system for controlling an equilibrium point that is a desirable operating variable output with the primary control in a steady state.

BACKGROUND

In process control systems for controlling process variables, such as temperatures, pressures, and the like, the systems are based on the combinations of single actuators with single controlled variables PV, such as, for example, a single heater, a single temperature sensor, and a single temperature controller for a case wherein it is the temperature that is subject to control.

On the other hand, a method for controlling temperature has also been proposed wherein two actuators, specifically a heating actuator (a heater) and a cooling actuator (a cooler) are operated cooperatively. See, for example, Japanese Patent No. 3805957 ("the JP '957"). FIG. 10 is a diagram illustrating an example of the application, to temperature control of a heat treatment furnace, of a controlling device as disclosed in the JP '957, and FIG. 11 is a block diagram illustrating the structure of a controlling device disclosed in the JP '957. The heat treatment furnace 100 circulates air that is heated by the heater 101 and cooled by the cooler 102.

The controller 104 calculates an operating variable MV_A for heating through a PID control calculation based on a controlled variable (a temperature measurement value) PV_A that is measured by a temperature sensor 103 within the heat treatment furnace 100, and based on a setting value SP_A. A controller 105 uses a desirable value for the heating operating variable MV_A of the controller 104 as a setting value SP_B, and uses the heating operating variable MV_A of the controller 104 as a controlled variable to calculate an operating variable MV_B for cooling, through a PID control calculation.

The technology disclosed in the JP '957 can improve energy efficiency by reducing offsetting of heating with cooling, rather than simply controlling the temperature. The distinctive feature of the technology disclosed in the JP '957 is the addition of a control loop that makes adjustments while constantly monitoring the heater output (the operating variable MV_A) while focusing on the equilibrium between the heater output and the cooler output, which is a factor that has an impact on energy efficiency.

The technology disclosed in the JP '957 is a control technology that assumes a combination of a single cooling system (a single cooling actuator) with a single heating system (a single heating actuator). However, the actuators that effect the energy efficiency are not necessarily limited to two actuators. For example, as illustrated in FIG. 12, a plurality of zones 106-1 through 106-4 that are to be heated in the heat treatment furnace 100 and a heater 101-1 through 101-4 may be provided for each individual zone 106-1 through 106-4, and, further, a single cooling device 102 may be provided for cooling the air within the heat treatment furnace 100, that is, a single cooling system may be combined with a plurality of heating systems.

In the structure in FIG. 12, if there is a plurality of normal control systems for the purpose of heating, these can control a plurality of controlled variables (temperatures), so the structure is one that can run without problems, insofar as energy efficiency is not taken into account. Moreover, from the perspective of manufacturing cost of the manufacturing equipment, this structure is actually a reasonable structure. In this way, it is not possible to apply the technology that is disclosed in the JP '957 to a configuration wherein there is a plurality of primary control systems for the primary purpose of control with only a single secondary control system for adjusting the equilibrium point that is the desired operating variable output when the primary control is in a study state.

The present invention is to solve the problem set forth above, and an aspect thereof is to provide a cooperative operating device and method able to achieve energy conservation in a multi-loop control system that has a plurality of primary control systems for the purpose of primary control and only a single secondary control system for controlling an equilibrium point that is a desirable operating variable output with the primary control in a steady state.

SUMMARY

A cooperative operating device according to the present invention includes: a plurality of first control calculating units, provided corresponding to a plurality of primary control systems, for inputting setting values for primary control and controlled variables for primary control and calculating first operating variables through control calculations; a plurality of first operating variable outputting units, provided for each primary control system, for outputting to an actuator of the corresponding primary control system, the first operating variable calculated by the first control calculating unit of the corresponding primary control system; a combining unit for combining the plurality of first operating variables through performing a weighting calculation on the plurality of first operating variables calculated by the plurality of first control calculating units, to output a second operating variable; a second control calculating unit provided corresponding to a single secondary control system for controlling an equilibrium point that is a desirable operating variable output with the primary control in a steady state, for inputting a specific operating variable setting value that indicates the equilibrium point and using the second operating variable that is outputted by the combining unit as a controlled variable input, to calculate a third operating variable through a control calculation; and a second operating variable outputting unit for outputting, to an actuator of the secondary control system, the third operating variable calculated by the second control calculating unit.

In an example configuration of a cooperative operating device according to the present invention, the control calculations performed by the first control calculating unit and the second control calculating unit are PID control calculations, and an integrating time, which is a PID parameter that is set in advance in the second control calculating unit, is a value that is no less than any of the integrating times that are set in advance in the first control calculating units.

In the example configuration of a cooperative operating device according to the present invention: the control calculations performed by the first control calculating unit and the second control calculating unit are PID control calculations; and a differentiating time, which is a PID parameter that is set in advance in the second control calculating unit, is a value that is no more than any of the differentiating times that are set in advance in the first control calculating units.

In the example configuration of a cooperative operating device according to the present invention: the control calculations performed by the first control calculating unit and the second control calculating unit are PID control calculations; and an integrating time limiter for limiting the integrating time, that is a PID parameter that is set in the second control calculating unit, to a value that is no less than any of the integrating times that are set in advance in the first control calculating units is further provided.

In the example configuration of a cooperative operating device according to the present invention: the control calculations performed by the first control calculating unit and the second control calculating unit are PID control calculations; and a differentiating time limiter for limiting the differentiating time, which is a PID parameter that is set in the second control calculating unit, to a value that is no more than any of the differentiating times that are set in advance in the first control calculating units is further provided.

The example configuration of a cooperative operating device according to the present invention further includes: an ordering unit for reordering in ascending or descending order of the plurality of first operating variables calculated by the plurality of first control calculating units; wherein: the combining unit combines the plurality of first operating variables through performing a weighting calculation on the plurality of first operating variables that have been reordered by the ordering unit.

In the example configuration of a cooperative operating device according to the present invention: the combining unit performs a weighting operation for selecting a minimum value or a maximum value of the first operating variables.

In the example configuration of a cooperative operating device according to the present invention: the weighting in the weighting calculation performed by the combining unit is variable weighting linked to the quantitative values of the first operating variables.

The example configuration of a cooperative operating device according to the present invention further includes: a controlling unit for monitoring state variables that affect the equilibrium point directly, and for applying a limitation to the operation of the third operating variables.

Moreover, a cooperative operating method according to the present invention includes: a first control calculating step for inputting setting values for primary control and controlled variables for primary control and calculating first operating variables through control calculations; a first operating variable outputting step for outputting, to actuators of the respective corresponding primary control systems, a plurality of first operating variables calculated in the first control calculating step; a combining step for combining the plurality of first operating variables through performing a weighting calculation on the plurality of first operating variables calculated in the first control calculating step, to obtain a second operating variable; a second control calculating step for inputting a specific operating variable setting value that indicates an equilibrium point that is a desirable operating variable output with the primary control in a steady state, and using the second operating variable that is obtained by the combining step as a controlled variable input, to calculate a third operating variable through a control calculation; and a second operating variable outputting step for outputting, to an actuator of a single secondary control system for adjusting the equilibrium point, a third operating variable calculated in the second control calculating step.

The present invention makes it possible to achieve energy conservation through making it possible to adjust the equilibrium point to a desirable value through combining first operating variables that are calculated by the first control calculating units, calculating a third operating variable, based on a second operating variable after said combining and an operating variable setting value that indicates a desirable equilibrium point, and outputting the results to an actuator of the secondary control system. The present invention is not limited to a multi-loop control system for heating and cooling, but can also be applied to other multi-loop control systems as well.

Moreover, in the present invention, operation may be performed through selecting/combining an operating variable from the stabilized main control system through the use of a value that is no less than any of the integrating times that are set in advance in the first control calculating unit, as the integrating time for the PID parameter that is set in advance in the second control calculating unit.

Moreover, in the present invention, operation may be performed through selecting/combining an operating variable from the stabilized main control system through the use of a value that is no more than any of the differentiating times that are set in advance in the first control calculating unit, as the differentiating time for the PID parameter that is set in advance in the second control calculating unit.

Moreover, in the present invention, operation may be performed through the selection/combination of an operating variable from a stabilized primary control system, through the provision of an integrating time limiter for limiting the integrating time, that is a PID parameter that is set in the second control calculating unit, to a value that is no less than any of the integrating times that are set in advance in the first control calculating unit.

Moreover, in the present invention, operation may be performed through the selection/combination of an operating variable from a stabilized primary control system, through the provision of an differentiating time limiter for limiting the differentiating time, that is a PID parameter that is set in the second control calculating unit, to a value that is no more than any of the differentiating times that are set in advance in the first control calculating unit.

Moreover, the present invention enables the combination of operating variables from the primary control system depending on priority order through reordering the plurality of first operating variables that are calculated by the plurality of first control calculating units in ascending order or descending order, and performing weighted control of the plurality of first operating variables that have been reordered by the ordering unit.

Additionally, the present invention makes it possible to perform a combining process that is adapted to the situation, through having the weighting in the weighting calculations that are performed by the combining unit be variable weighting that is linked to the quantitative values of the first operating variables.

Moreover, the present invention enables control of a third operating variable so that a state variable does not fall below a lower limit value or does not exceed an upper limit value, through the provision of a controlling unit that monitor the state variables that directly influence the equilibrium point and apply limits to the operations of the third operating variable.

BRIEF DESCRIPTIONS OF THE DRAWINGS

DETAILED DESCRIPTION

Figure 1:
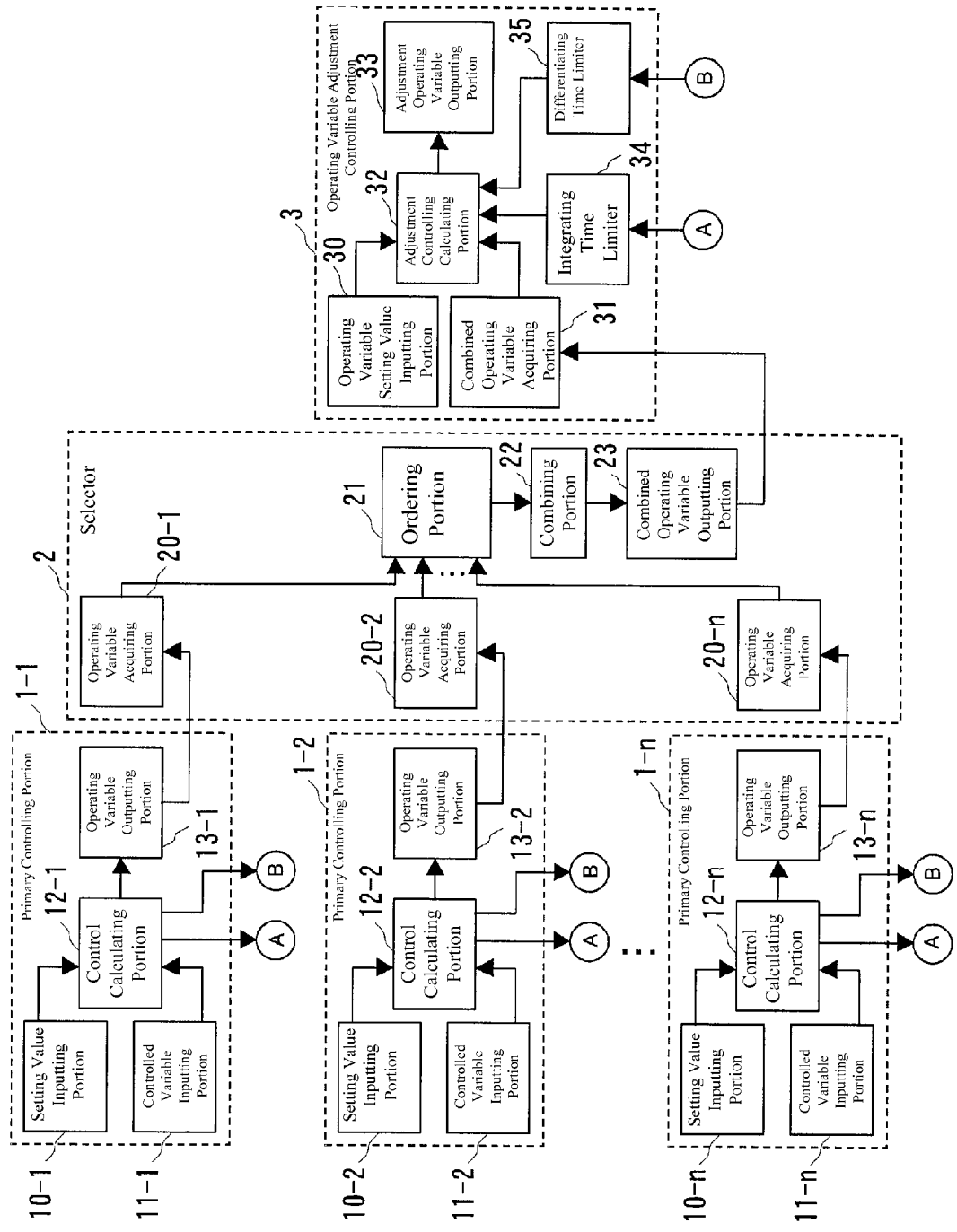
FIG. 1 is a block diagram illustrating a structure of a cooperative operating device according to Example according to the present invention.

Envisioning the application of a plurality of primary control systems for an object wherein the equilibrium points to which they should be adjusted are the same for all, the underlying principle is that first operating variables of the plurality of primary control systems are combined through a selector, and thereafter the treatment disclosed in the JP '957 (the adjustment to the operating variable) is applied. This underlying principle makes it possible to reduce the overall amount of calculation through the use of an equilibrium point that is shared by a plurality of primary control systems. There is only a single control calculating portion for adjusting the operating variable. This underlying principle provides a selector for selecting an operating variable of a high priority for the equilibrium point conditions, thus facilitating operation because the operation is that of determining a way of selecting/combining operating variables from a steady-state primary control system. Moreover, insofar as this enables handling of high-priority variables, this is a method for applying a multi-loop control system of high practical value.

Greater precision can be achieved through the use of PID control calculations as the controlling calculations, through regulating the setting states of the PID parameters, and limiting, through a limiter, the setting states of the PID parameters, to enable operation through selection/combination of operating variables from a city-state primary control system. For example, a state may be created wherein the PID parameters for a secondary control system wherein the operating variables are adjusted in relation to PID parameters of all of the plurality of primary control systems are set so as to have specific magnitude relationships. Conversely, a limiter for causing such a setting state may be provided.

If combining operating variables from the primary control system following the priority order by the selector, there will be more cases wherein the priority order is determined by the magnitude relationships of the values inputted into the selector than cases wherein the priority order is determined in advance. For example, there are cases wherein the minimum value or the maximum value for the operating variable is simply selected. In particular, of the plurality of primary control systems, the one in the most disadvantageous controlling state should be selected with priority, and the operating variables of such primary control systems indicate minimum values or maximum values. That is, selecting the minimum value or the maximum value from among the operating variables of the plurality of primary control systems would be extremely rational. Consequently, preferably a selector is provided for combining the operating variables through a weighting calculation, or the like, after the operating variables from the primary control systems have been reordered according to magnitude relationships. In such a state it is possible to determine practically the priority for the operating variables by a selector that is actuated adaptively.

Note that reordering the operating variables will cause the rate of change in the output value from the selector to be discontinuous. Because a controlling calculation for adjusting the operating variable is performed in a stage subsequent to the selector, preferably a structure is provided so as to suppress bumps in the output of the control calculations.

Example

Figure 2:
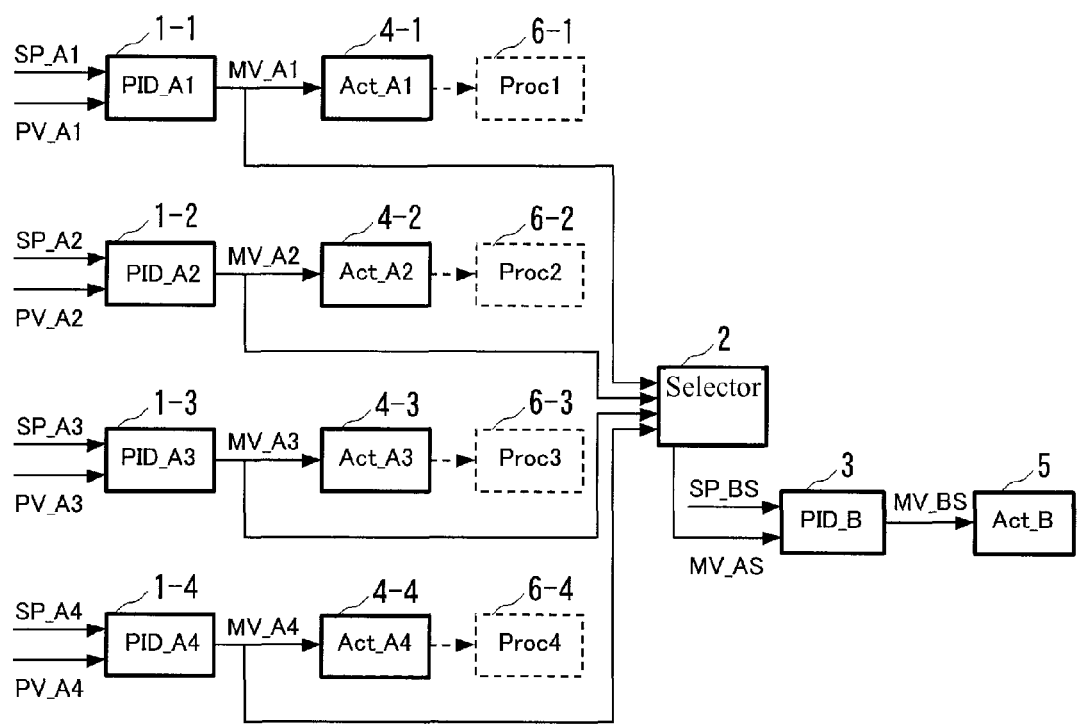
FIG. 2 is a block line diagram illustrating a structure of a control system according to the Example.

Forms for carrying out the present invention will be explained below in reference to the figures. The present example corresponds to the principles of the Invention, described above. FIG. 1 is a block diagram illustrating the configuration of a cooperative operating device that is a control device according to the present example, and FIG. 2 is a block line diagram of a control system according to the present example. The cooperative operating device is structured from n primary controlling portions 1-1 through 1-$n$ (where n is an integer that is no less than 2), a selector 2, and an operating variable adjustment controlling portion 3.

Each primary controlling portion 1-$i$ (where i=1 through n) respectively includes: a setting value inputting portion 10-$i$ for inputting a setting value SP_Ai; a controlled variable inputting portion 11-$i$ for inputting a controlled variable PV_Ai; a control calculating portion 12-$i$ (first control calculating means) for calculating an operating variable MV_Ai (first operating variable) based on the setting value SP_Ai and the controlled variable PV_Ai; and an operating variable outputting portion 13-$i$ (first operating variable outputting means) for outputting the operating variable MV_Ai to the actuator of the corresponding primary control system.

The selector 2 includes: an operating variable acquiring portion 20-$i$ that is provided for each individual primary controlling portion 1-$i$; an ordering portion 21 for reordering n operating variables MV_Ai in ascending or descending order; a combining portion 22 for combining operating variables MV_Ai through performing weighting calculations on the operating variables MV_Ai that have been reordered by the ordering portion 21; and a combined operating variable outputting portion 23 for outputting, to the operating variable adjustment controlling portion 3, the combined operating variable MV_AS (a second operating variable) by the combining portion 22.

The operating variable adjustment controlling portion 3 includes: an operating variable setting value inputting portion 30 for inputting an operating variable setting value SP_BS that indicates an equilibrium point that is a desirable operating variable output for a steady state of the primary control; a combined operating variable acquiring portion 31 for acquiring the combined operating variable MV_AS that is outputted from the selector 2; an adjustment controlling calculating portion 32 (second control calculating means) for calculating an adjustment operating variable MV_BS (a third operating variable) based on the operating variable setting value SP_BS and the combined operating variable MV_AS; an adjustment operating variable outputting portion 33 (second operating variable outputting means) for outputting the adjustment operating variable MV_BS from the adjustment controlling calculating portion 32 to the actuator of the secondary control system; an integrating time limiter 34 for controlling an integrating time TI_B, which is a PID parameter that is set in the adjustment controlling calculating portion 32, to no less than any of the integrating times TI_Ai that are PID parameters that are set in advance in the control calculating portions 12-$i$; and a differentiating time limiter 35 for limiting a differentiating time TD_B, which is a PID parameter that is set in the adjustment controlling calculating portion 32, to a value that is no more than any of the differentiating times TD_Ai that are PID parameters that are set in advance in the control calculating portions 12-$i$.

FIG. 2 shows a configuration for the control system in the case of n=4. 4-1 through 4-4 in FIG. 2 are actuators in the primary control system, 5 is an actuator in the secondary control system, and 6-1 through 6-4 are controlled subjects. A first primary control system is structured from the primary controlling portion 1-1, the actuator 4-1, and the controlled subject 6-1; a second primary control system is structured from the primary controlling portion 1-2, the actuator 4-2, and the controlled subject 6-2; a third primary control system is structured from the primary controlling portion 1-3, the actuator 4-3, and the controlled subject 6-3; and a fourth primary control system is structured from the primary controlling portion 1-4, the actuator 4-4, and the controlled subject 6-4. Moreover, the secondary control system is structured from the operating variable adjustment controlling portion 3 and the actuator 5.

The operation of the cooperative operating device according to the present example will be explained below in reference to FIG. 3. The setting values SP_Ai for each of the individual primary controlling portions 1-$i$ (where i=1 through n) are set by an operator, or the like, and inputted into the control calculating portions 12-$i$ through the setting value inputting portions 10-$i$ (Step S100 in FIG. 3).

Figure 3:
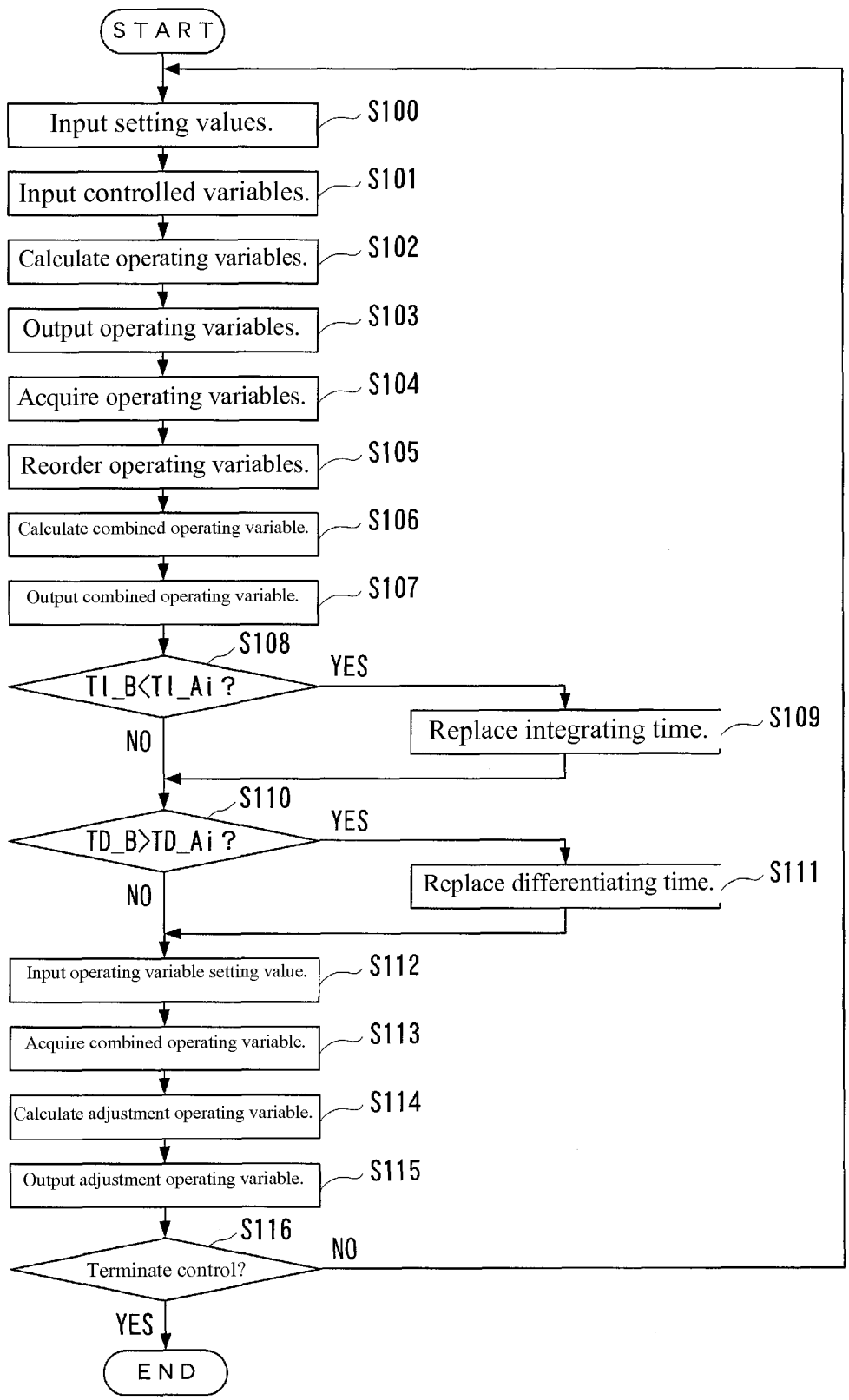
FIG. 3 is a flowchart illustrating operation of the cooperative operating device according to the Example.
Figure 12:
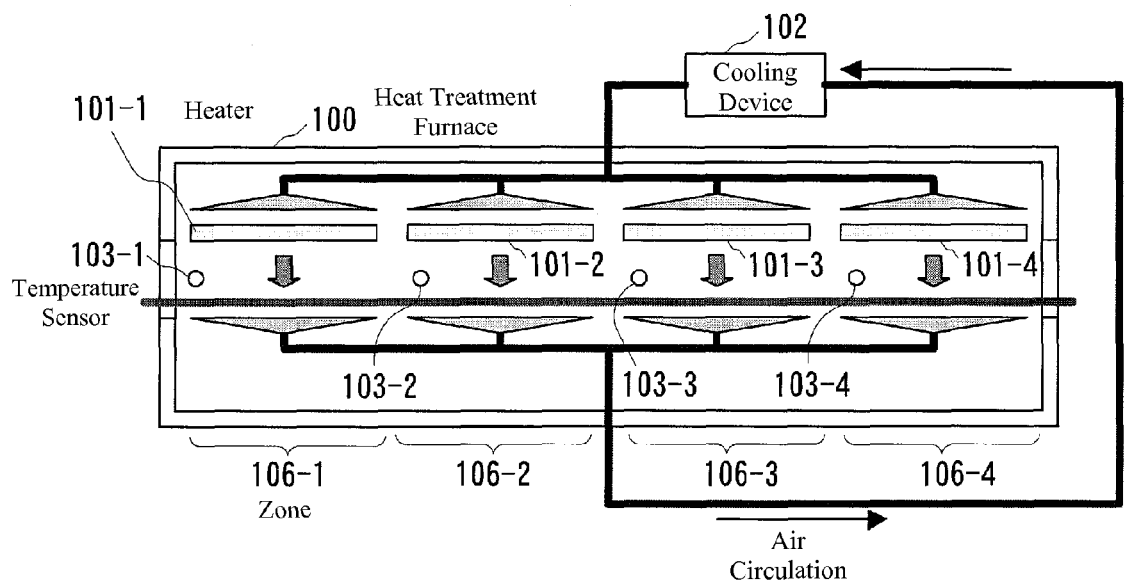
FIG. 12 is a diagram illustrating the combination of a plurality of heating systems and a single cooling system.

The controlled variables PV_Ai for the individual primary controlling portions 1-$i$ are measured by sensors, or the like (which, in the present example, are the temperature sensors 103-1 through 103-4 in FIG. 12), and are inputted into the control calculating portions 12-$i$ through the controlled variable inputting portions 11-$i$ (Step S101 in FIG. 3).

The control calculating portions 12-$i$ of the individual primary controlling portions 1-$i$ calculate the operating variables MV_Ai based on the setting values SP_Ai and the controlled variables PV_Ai, by performing PID control calculations such as a transfer function equation, shown below (Step S102 in FIG. 3):

$$MV\_Ai = (100/PB\_Ai)\{1+(1/TI\_Ais)+TD\_Ais\} \times (SP\_Ai-PV\_Ai) \quad (1)$$

In Equation (1), PB_Ai is a proportional band, TI_Ai is an integrating time, TD_Ai is a differentiating time, and s is the Laplace operator.

The operating variable outputting portion 13-$i$ for each individual primary controlling portion 1-$i$ outputs, to the actuator 4-$i$ of the corresponding primary control system, the operating variable MV_Ai that is calculated by the control calculating portion 12-$i$ (Step S103 in FIG. 3). Because a setting value inputting portion 10-$i$, a controlled variable inputting portion 11-$i$, a control calculating portion 12-$i$, and an operating variable outputting portion 13-$i$ are provided for each individual primary controlling portion 1-$i$, the procedures in Step S100 through S103 are executed individually for each primary controlling portion 1-$i$.

Next the individual operating variable acquiring portions 20-$i$ of the selector 2 acquire the operating variables MV_Ai from the operating variable outputting portions 13-$i$ of the respective corresponding primary controlling portions 1-$i$ (Step S104 in FIG. 3).

The ordering portion 21 reorders the operating variables MV_Ai in either ascending or descending order, to obtain the operating variables MV_AXj (where j=1 through n) after reordering (Step S105 in FIG. 3).

The combining portion 22 performs a weighting calculation (a weighted average calculation) such as in the following equation on the operating variables MV_AXj that have been reordered by the ordering portion 21, to obtain a combined operating variable MV_AS (Step S106 in FIG. 3). The combining portion 22 essentially combines the operating variables MV_Ai selectively thereby.

[Expression 1]

$$MV\_AS = \sum_{j=1}^{n} (\alpha j \times MV\_AXj) \quad (2)$$

In Equation (2), $\alpha j$ is a weighting that is set in advance, where the sum of the weightings $\alpha j$ (j=1 through n) is 1.0. If, for example, the ordering portion 21 has reordered the operating variables MV_Ai in ascending order and the weighting $\alpha 1$ corresponding to the smallest operating variable MV_AX1 is 1.0 and the weightings $\alpha 2$ through an corresponding to the other operating variables MV_AX2 through MV_AXn are 0, then the combining portion 22 functions as a minimum value selecting portion. Moreover, if the ordering portion 21 has reordered the operating variables MV_Ai in descending order and the weighting $\alpha 1$ corresponding to the largest operating variable MV_AX1 is 1.0 and the weightings $\alpha 2$ through an corresponding to the other operating variables MV_AX2 through MV_AXn are 0, then the combining portion 22 functions as a maximum value selecting portion.

Note that the procedure by the ordering portion 21 is not essential. Instead, weighted averaging of the operating variables MV_Ai may be calculated through applying variable weightings $\beta i$ that are linked to the values of the operating variables MV_Ai such as, for example, if the operating variables MV_Ai can assume numeric values from 0% through 100%, a weighting $\beta i$ of 3.0 is applied to an operating variable MV_Ai in the range of 0% through 19.9%, a weighting βi of 2.5 is applied to an operating variable MV_Ai in the range of 20.0% through 39.9%, a weighting βi of 2.0 is applied to an operating variable MV_Ai in the range of 40.0% through 59.9%, a weighting βi of 1.5 is applied to an operating variable MV_Ai in the range of 60.0% through 79.9%, and a weighting βi of 1.0 is applied to an operating variable MV_Ai in the range of 80.0% through 100.0%. In this case, the calculating equation in the combining portion 22 will be as shown below. Note that there is no limitation to the sum of the weightings βi (where i=1 through n) to being 1.0.

[Expression 2]

$$MV\_AS = \sum_{i=1}^{n} (\beta i \times MV\_Ai) / \sum_{i=1}^{n} \beta i \qquad (3)$$

The combined operating variable outputting portion 23 outputs, to the operating variable adjustment controlling portion 3, the combined operating variable MV_AS that has been calculated by the combining portion 22 (Step S107 in FIG. 3).

Following this, the integrating time limiter 34 of the operating variable adjustment controlling portion 3 compares the integrating time TI_B that has been set in the adjustment controlling calculating portion 32 to each of the integrating times TI_Ai that have been set in each of the control calculating portions 12-$i$, of which there is a plurality (Step S108 in FIG. 3), and if the integrating time TI_B is a value that is smaller than the any of the plurality of integrating times TI_Ai (YES in Step S108), then the integrating time TI_B is replaced with the maximum value TI_Amax from among the integrating times TI_Ai, as in the following equation (Step S109 in FIG. 3).

If $TI\_B < TI\_Ai$ then $TI\_B = TI\_A$max    (4)

That is, the integrating time TI_B is constrained to a value that is equal to or greater than all of the integrating times TI_Ai. The procedure for limiting the integrating time TI_B in this way constrains the cooperative operation of the primary control systems and the secondary control system so as to operate easily as a stable control system.

On the other hand, the differentiating time limiter 35 compares the differentiating time TD_B that has been set in the adjustment controlling calculating portion 32 to each of the differentiating times TD_Ai that have been set in each of the control calculating portions 12-$i$, of which there is a plurality (Step S110 in FIG. 3), and if the differentiating time TD_B is a value that is greater than the any of the plurality of differentiating times TD_Ai (YES in Step S110), then the integrating time TI_B is replaced with the minimum value TD_Amin from among the differentiating times TD_Ai, as in the following equation (Step S111 in FIG. 3).

If $TD\_B > TD\_Ai$ then $TD\_B = TD\_A$min    (5)

That is, the differentiating time TD_B is constrained to a value that is equal to or less than all of the differentiating times TD_Ai. The procedure for limiting the differentiating time TD_B in this way constrains the cooperative operation of the primary control systems and the secondary control system so as to operate easily as a stable control system.

Following this, the operating variable setting value SP_BS that indicates the equilibrium point that is to be adjusted is set by an operator, or the like, and inputted into the adjustment controlling calculating portion 32 through the operating variable setting value inputting portion 30 (Step S112 in FIG. 3). The equilibrium point is a desirable operating variable output with the primary control in a steady-state, and is set in advance considering energy efficiency, and the like. Note that in the present example, as described above, it is envisioned that the equilibrium point is the same for all of the primary control systems.

The combined operating variable acquiring portion 31 acquires the combined operating variable MV_AS from the selector 2 (Step S113 in FIG. 3).

Following this, the adjustment controlling calculating portion 32 calculates the adjustment operating variable MV_BS by performing a PID control calculation, such as the transfer function equation shown below, based on the operating variable setting value SP_BS and the combined operating variable MV_AS (Step S114 in FIG. 3):

$$MV\_BS = (100/PB\_B)\{1 + (1/TI\_Bs) + TD\_Bs\} \times (SP\_BS - MV\_AS) \qquad (6)$$

In Equation (6), PB_B is a proportional band, TI_B is an integrating time, TD_B is a differentiating time, and s is the Laplace operator. Note that in Equation (6), the integration calculation part and the differentiation calculating part are parts for calculating the dynamic properties in control, enabling the dynamic behavior to be adjusted through the integrating time TI_B and the differentiating time TD_B.

The adjustment operating variable outputting portion 33 outputs the adjustment operating variable MV_BS that has been calculated by the adjustment controlling calculating portion 32 to the actuator 5 of the corresponding secondary control system (Step S115 in FIG. 3).

The processes in Step S100 through S115 as described above are repeated at each control interval until the control is terminated through, for example, an instruction from an operator (YES in Step S116 in FIG. 3).

Figure 4:
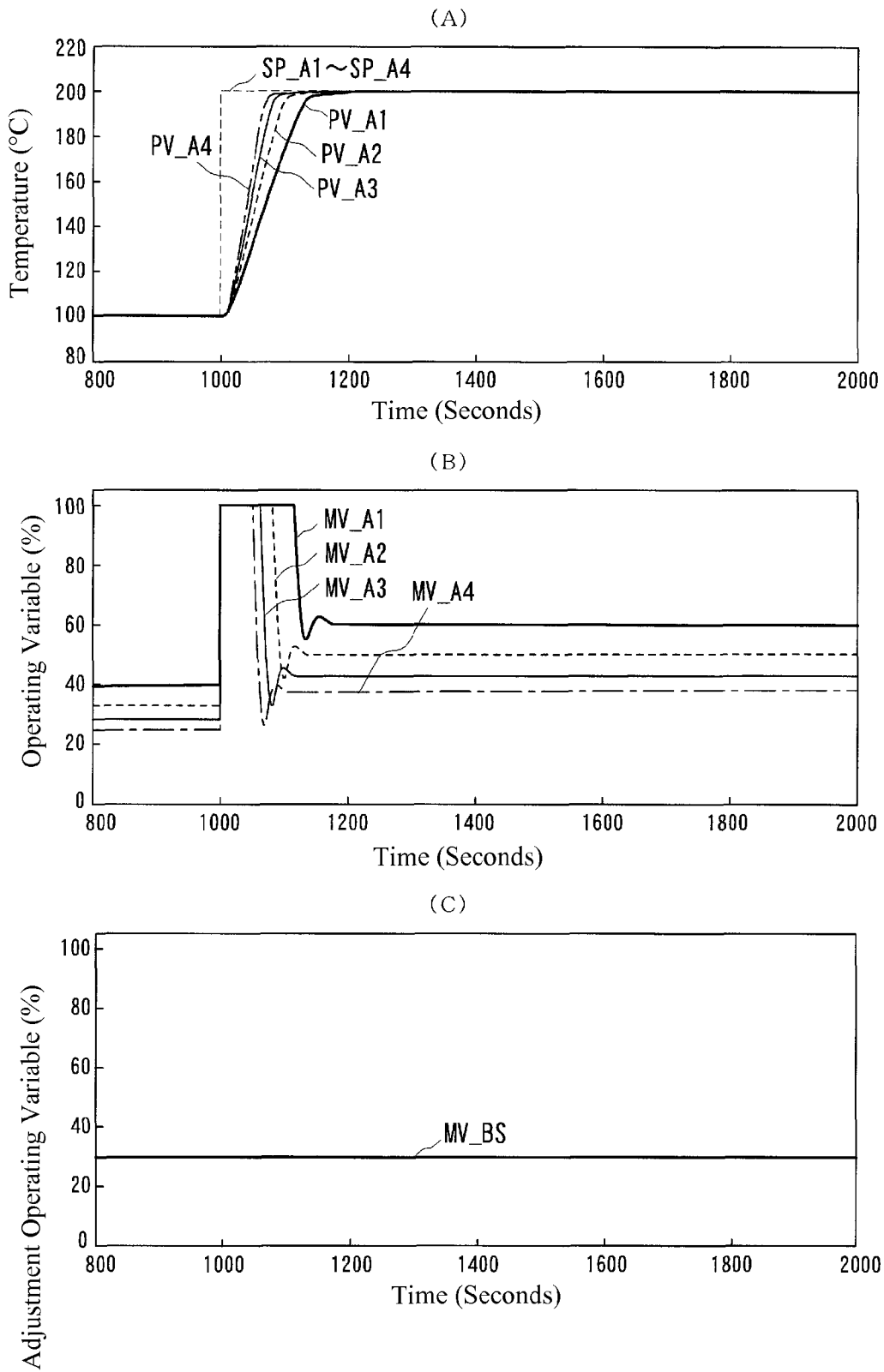
FIG. 4 is a diagram illustrating an example of operation of a normal controlling device.
Figure 5:
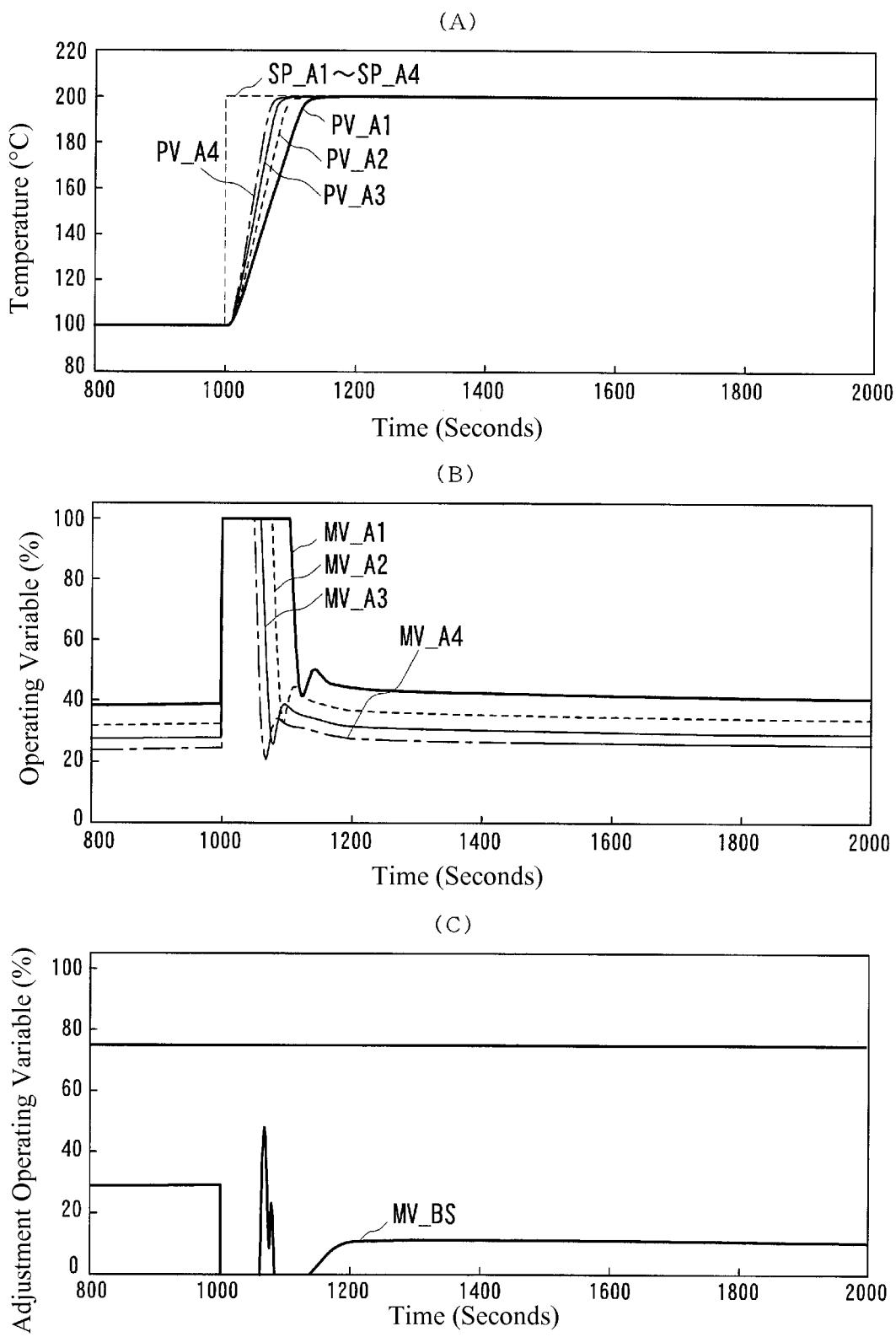
FIG. 5 is a diagram illustrating an example of the operation of the cooperative operating device according to the Example.

FIG. 4 (A) through FIG. 4 (C) and FIG. 5 (A) through FIG. 5 (C) show the results of simulations that show the effects of the present example. Here the quantitative values were calculated through simulations for the case wherein the temperatures of four zones within a heat treatment furnace are increased from 100° C. to 200° C., envisioning a scenario wherein the number of primary control systems is n=4, where a cooling control system that is a single secondary control system for adjusting the equilibrium point with the four primary control systems for heating is envisioned, as illustrated in FIG. 12.

FIG. 4 (A) through FIG. 4 (C) show the operations when the adjustment operating variable MV_BS is kept constant in the structure illustrated in FIG. 1, illustrating operation that is equivalent to that of a normal controlling device. FIG. 4 (A) shows the change in temperatures PV_A1 through PV_A4 (controlled variables) when a step input with setting values of SP_A1 through SP_A4=200° C. is applied, where FIG. 4 (B) illustrates the change to the operating variables MV_A1 through MV_A4 that are inputted from the primary controlling portions 1-1 through 1-4 at the time of the step input, and FIG. 4 (C) illustrates the adjustment operating variable MV_BS.

The value of the adjustment operating variable MV_BS is set to MV_BS=30.0% to make it possible to maintain the minimum values of the operating variables MV_A1 through MV_A4 at about 25% when steady, when maintaining the temperature of the heat treatment furnace 100 at 100° C., prior to the increase in temperature. Because the adjustment operating variable MV_BS is non-changing, after the temperature increases to 200° C., the operating variables for MV_A1 through MV_A4 will be higher as a whole, and the minimum operating variable MV_A4 will be greater than about 25% when in the steady-state. That is, a state wherein the efficiency in terms of energy is poor will continue.

FIG. 5 (A) through FIG. 5 (C) illustrate the operation of the cooperative operating device according to the present example, where FIG. 5 (A) shows the change in the temperatures PV_A1 through PV_A4 (the controlled variables) when a step input of setting values SP_A1 through SP_A4=200° C. are applied, FIG. 5 (B) shows the change in the operating variables MV_A1 through MV_A4 that are outputted from the primary controlling portions 1-1 through 1-4 at the time of this step input, and FIG. 5 (C) shows the change in the adjustment operating variable MV_BS that is outputted from the operating variable adjustment controlling portion 3.

The value for the operating variable setting value SP_BS is SP_BS=25.0% in order to maintain the minimum value for the operating variables MV_A1 through MV_A4 at about 25% in the steady-state. The selector 2 is set so as to function as a minimum value selecting portion. In the present example, the adjustment operating variable MV_BS is variable, so when compared to the case in FIG. 4 (B), the operating variables MV_A1 through MV_A4, even after the increase in temperature of the heat treatment furnace has been increased to 200° C., will, over all, be lower, and it is understood that the smallest operating variable MV_A4 can be maintained at about 25% in that the steady-state. That is, a state wherein the efficiency in terms of energy is good will continue. Moreover, in most of the time bands when the temperature is increasing, the adjustment operating variable MV_BS is 0%, so that the cooling device of the secondary control system does not operate, so the heating operation itself can be understood to have good efficiency in terms of energy.

As described above, in the present example of the operating variables MV_A1 through MV_A4 that are calculated by the primary controlling portions 1-1 through 1-n are combined and an adjustment operating variable MV_BS is calculated and outputted to these actuator in the secondary control system, based on the operating variable setting value SP_BS that indicates the desirable equilibrium point and the combined operating variable MV_AS, thereby making it possible to adjust the equilibrium point to a desirable value, making it possible to achieve conservation of energy. In the present example, there is no limitation to a multi-loop control system for cooling in the heating, but rather this can be applied to other multi-loop control systems as well.

Another Example

Figure 6:
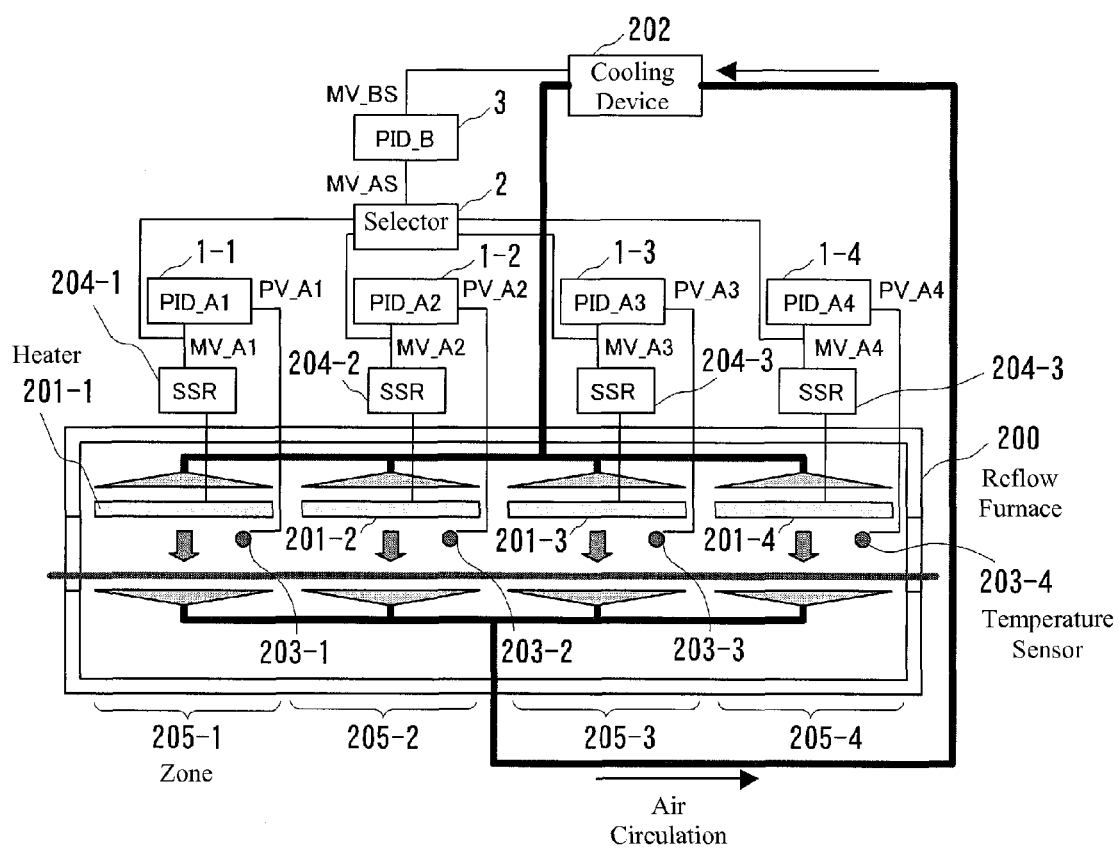
FIG. 6 is a block diagram illustrating a configuration for a heating device according to Another Example according to the present invention.

Another Example according to the present invention will be explained next. FIG. 6 is a block diagram illustrating a structure of a heating device according to the Another Example. The present example is to illustrate an example wherein the cooperative operating device of the Example is applied to a heating device that is structured with a heating control system that is four primary control systems and a cooling control system that is a single secondary control system. A tunnel-type reflow furnace 200 has four zones 205-1 through 205-4 that are to be heated, with heaters 201-1 through 201-4 provided at the individual zones 205-1 through 205-4, and provided with a single cooling device 202 (a cooling actuator) for cooling the air within the reflow furnace 200. The heaters 201-1 through 201-4 together with SSRs (Solid-state Relays) 204-1 through 204-4, structure the heating actuators of the primary control systems.

The primary controlling portions 1-1 through 1-4 perform temperature control through heating the air that circulates in the reflow furnace 200. The temperatures PV_A1 through PV_A4 (controlled variables) of the individual zones 205-1 through 205-4 in the reflow furnace 200 are measured individually by temperature sensors 203-1 through 203-4. The SSRs 204-1 through 204-4 adjust the power that is supplied to the heaters 201-1 through 201-4 depending on the operating variables MV_A1 through MV_A4 that are outputted from the primary controlling portions 1-1 through 1-4. The circulating air is collected in a circulating path that is in common for the four zones, after passing through each of the zones 205-1 through 205-4, and after cooling by a cooling device 202, such as a water jacket, is supplied to the individual zones 205-1 through 205-4. The minimum required operating variables MV_A1 through MV_A4 that can be controlled by the primary control systems go to the operating variable setting value SP_BS, that is, to the equilibrium point for that which is adjusted. The operating variable setting value SP_BS is, for example, 20%.

In order to increase the operating variables MV_A1 through MV_A4 of the primary control systems it is necessary to increase the adjustment operating variable MV_BS that is supplied to the cooling device 202, and, conversely, in order to decrease the operating variables MV_A1 through MV_A4 of the primary control systems it is necessary to decrease the adjustment operating variable MV_BS that is supplied to the cooling device 202. Consequently, control calculations for reverse actions are applied to the adjustment controlling calculating portion 32 for the operating variable adjustment controlling portion 3.

In the four primary control systems, the one that is in the most disadvantageous state of control is the one that shows the minimum value of the operating variables MV_A1 through MV_A4. Consequently, the selector 2 should select, and output as the combined operating variable MV_AS, the smallest value from among the four operating variables MV_A1 through MV_A4. However, if necessary in control performance, instead the weightings αj and βi may be adjusted as appropriate.

The integrating time TI_B that is set in the adjustment controlling calculating portion 32 of the operating variable adjustment controlling portion 3 is set so as to be no less than the maximum value TI_Amax of the integrating times TI_Ai that are set in the control calculating portions 12-i of the four primary controlling portions 1-i (where i is 1 through 4). Moreover, the differentiating time TD_B that is set in the adjustment controlling calculating portion 32 is set so as to be no more than the smallest TD_Amin among the differentiating times TD_Ai that are set in the control calculating portions 12-i of the primary controlling portions 1-i.

For example, the integrating times TI_Ai that are set in the control calculating portions 12-i are set to TI_A1=40.0 seconds, TI_A2=44.0 seconds, TI_A3=48.0 seconds, and TI_A4=52.0 seconds, and the differentiating times TD_Ai that are set in the control calculating portions 12-i are set to TD_A1=10.0 seconds, TD_A2=11.0 seconds, TD_A3=12.0 seconds, and TD_A4=13.0 seconds. In this case, the integrating time that is set in the adjustment controlling calculating portion 32 is TI_B≥52.0 seconds, and the differentiating time that is set in the adjustment controlling calculating portion 32 is TD_B≤10.0 seconds.

Note that with the cooperative operating device according to the present example, preferably there is a structure that is provided with a controlling portion (not shown) for monitoring and controlling the circulating air temperature at the outlet of the cooling device, which is a state variable that has a direct influence on the equilibrium point. Specifically, when there is an excessive cooling state wherein the circulating air temperature at the outlet of the cooling device is less than a specific lower limit value, the controlling portion limits the adjustment operating variable MV_BS so as to not increase, and, conversely, when there is an inadequate cooling state wherein the circulating air temperature at the outlet of the cooling device is more than a specific upper limit value, the controlling portion limits the adjustment operating variable MV_BS so as to not decrease. That is, the controlling portion controls the adjustment operating variable MV_BS so that the temperature of the circulating air at the outlet of the cooling device will not fall below a lower limit value and will not rise above an upper limit value.

Yet Another Example

Figure 7:
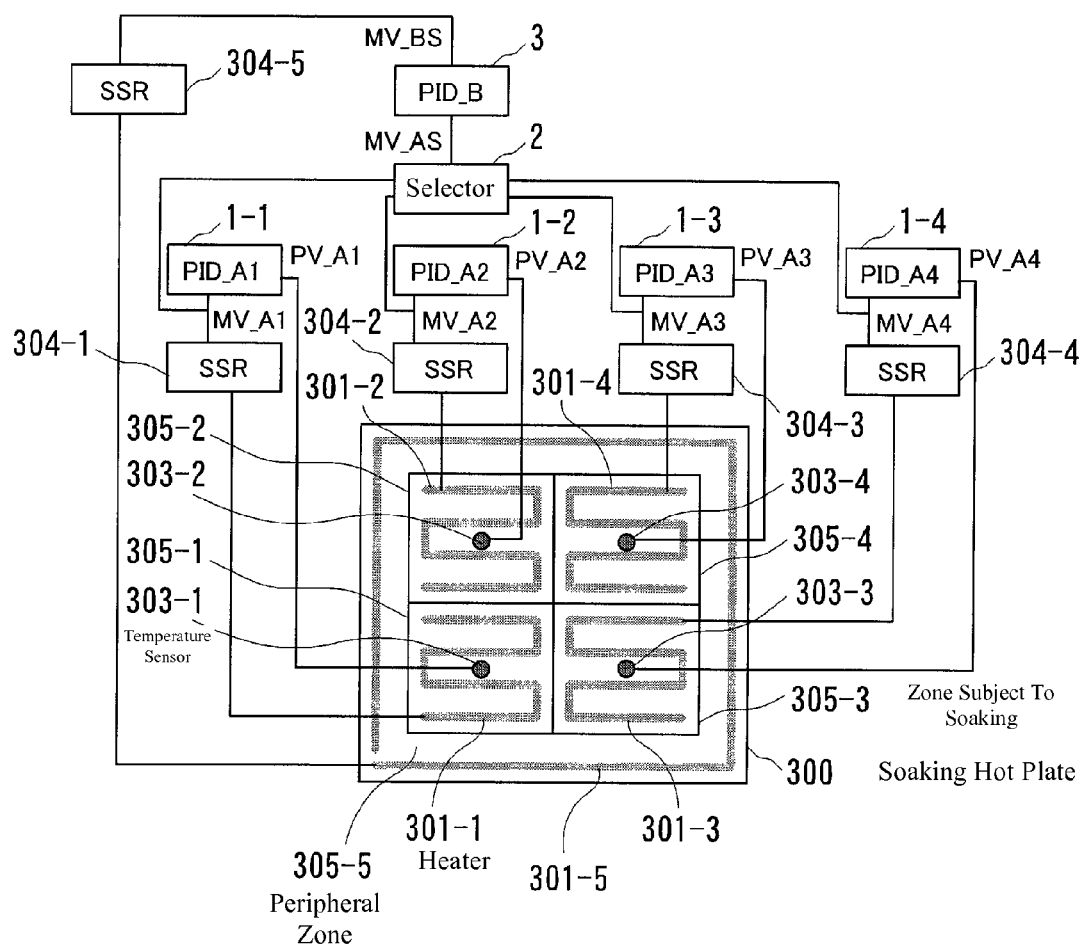
FIG. 7 is a block diagram illustrating a structure of a heating device according to Yet Another Example according to the present invention.

Yet Another Example according to the present invention will be explained next. FIG. 7 is a block diagram illustrating a structure of a heating device according to the Yet Another Example. The present example is to illustrate an example wherein the cooperative operating device of the Example is applied to a heating device that is structured with a cooling control system that is four primary control systems and a cooling control system that is a single secondary control system. A soaking hotplate 300 has four soaking zones 305-1 through 305-4 that are to be heated, and a peripheral zone 305-5 for further soaking support, where embedded heaters 301-1 through 301-4 are provided for the individual zones 305-1 through 305-4, and an embedded heater 301-5 is provided in the peripheral zone 305-5. The heaters 301-1 through 301-4 together with the SSRs 304-1 through 404-4, structure the heating actuators of the primary control systems, and the heater 301-5 together with the FSR 304-5 structures the heating actuator of the secondary control system.

The primary controlling portions 1-1 through 1-4 perform temperature control through heating the zones 305-1 through 305-4. The temperatures PV_A1 through PV_A4 (controlled variables) of the individual zones 305-1 through 305-4 are measured individually by temperature sensors 303-1 through 303-4. The SSRs 304-1 through 304-4 adjust the power that is supplied to the heaters 301-1 through 301-4 depending on the operating variables MV_A1 through MV_A4 that are outputted from the primary controlling portions 1-1 through 1-4. Moreover, the peripheral zone 305-5 is also heated in the same way as the zones 305-1 through 305-4. The SSR 304-5 adjusts the power that is supplied to the heater 301-5 depending on the operating variable MV_BS that is outputted from the operating variable adjustment controlling portion 3. The minimum required operating variables MV_A1 through MV_A4 that can be controlled by the primary control systems go to the operating variable setting value SP_BS, that is, to the equilibrium point for that which is adjusted. The operating variable setting value SP_BS is, for example, 20%.

In order to increase the operating variables MV_A1 through MV_A4 of the primary control systems it is necessary to decrease the adjustment operating variable MV_BS of the peripheral zone 305-5, and, conversely, in order to decrease the operating variables MV_A1 through MV_A4 of the primary control systems it is necessary to increase the adjustment operating variable MV_BS of the peripheral zone 305-5. Consequently, control calculations for forward actions are applied to the adjustment controlling calculating portion 32 for the operating variable adjustment controlling portion 3.

In the four primary control systems, the one that is in the most disadvantageous state of control is the one that shows the minimum value of the operating variables MV_A1 through MV_A4. Consequently, the selector 2 should select, and output as the combined operating variable MV_AS, the smallest value from among the four operating variables MV_A1 through MV_A4. However, if necessary in control performance, instead the weightings αj and βi may be adjusted as appropriate.

The integrating time TI_B that is set in the adjustment controlling calculating portion 32 of the operating variable adjustment controlling portion 3 is set so as to be no less than the maximum value TI_Amax of the integrating times TI_Ai that are set in the control calculating portions 12-$i$ of the four primary controlling portions 1-$i$ (where i is 1 through 4). Moreover, the differentiating time TD_B that is set in the adjustment controlling calculating portion 32 is set so as to be no more than the smallest TD_Amin among the differentiating times TD_Ai that are set in the control calculating portions 12-$i$ of the primary controlling portions 1-$i$.

Note that with the cooperative operating device according to the present example, preferably there is a structure that is provided with a controlling portion (not shown) for monitoring and controlling the temperature of the peripheral zone 305-5, which is a state variable that has a direct influence on the equilibrium point. Specifically, when there is an excessive heating state wherein the temperature of the peripheral zone 305-5 is more than a specific upper limit value, the controlling portion limits the adjustment operating variable MV_BS so as to not increase, and, conversely, when there is an inadequate heating state wherein the temperature of the peripheral zone 305-5 is less than a specific lower limit value, the controlling portion limits the adjustment operating variable MV_BS so as to not decrease. That is, the controlling portion controls the adjustment operating variable MV_BS so that the temperature peripheral zone 305-5 will not rise above an upper limit value and will not fall below a lower limit value.

Further Example

Figure 8:
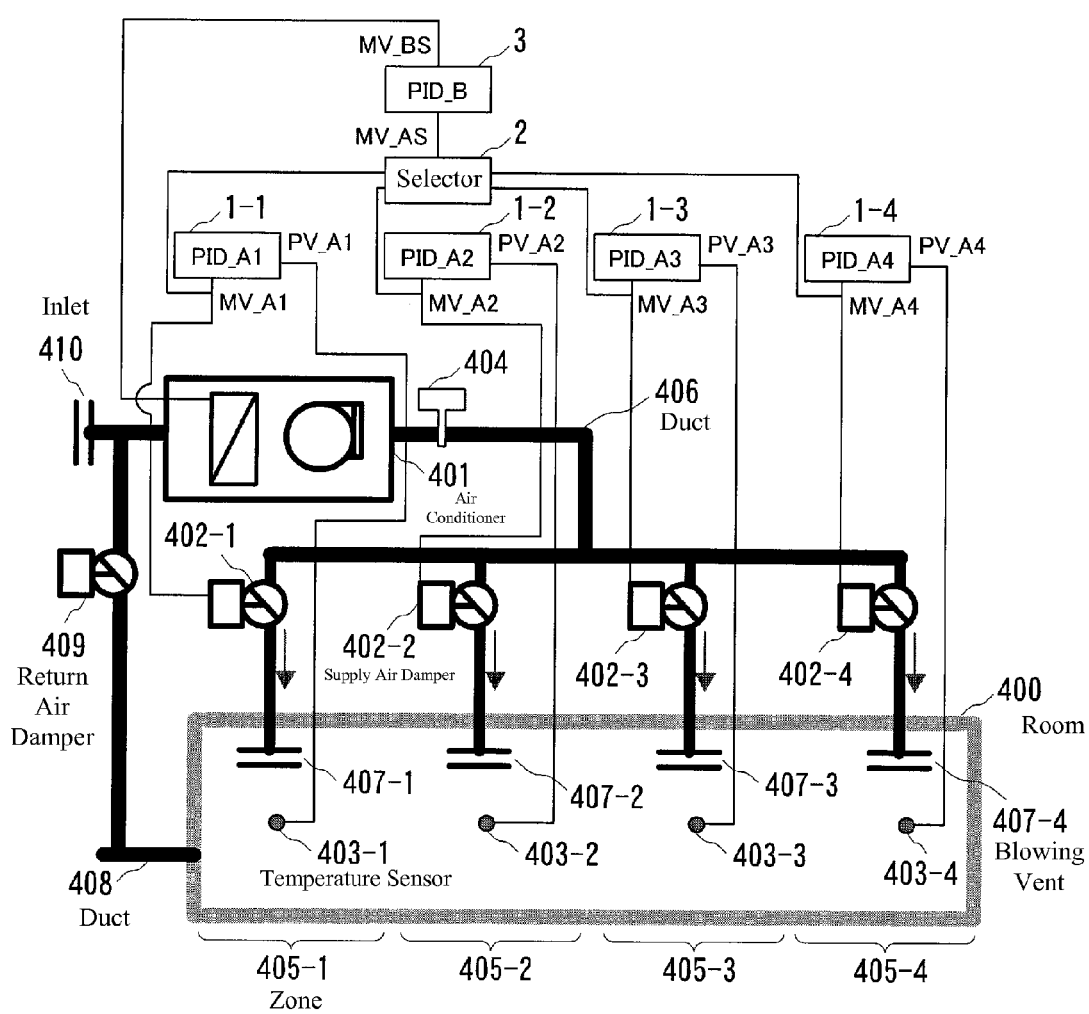
FIG. 8 is a block diagram illustrating configuration of a central air-conditioning system according to Further Example according to the present invention.

Further Example according to the present invention will be explained next. FIG. 8 is a block diagram illustrating a configuration of a central air-conditioning system according to the Further Example according to the present invention. The present example is to illustrate an example wherein the cooperative operating device of the Example is applied to a central air-conditioning system that is structured with a supply air flow rate control system that is four primary control systems and a supply air temperature control system that is a single secondary control system. A room 400 has four zones 405-1 through 405-4 for which the temperature is to be controlled, where supply air dampers 402-1 through 402-4 (supply air flow rate actuators) are provided for the individual zones 405-1 through 405-4. An air conditioner 401 structures the supply air temperature actuator of the secondary control system.

The primary controlling portions 1-1 through 1-4 perform room temperature control through the supply air flow rates to the individual zones 405-1 through 405-4. The temperatures PV_A1 through PV_A4 (controlled variables) of the individual zones 405-1 through 405-4 are measured individually by temperature sensors 403-1 through 403-4. An air conditioner 401 that is shared by the four zones cools the supply air to a specified temperature if in cooling mode, and heats the supply air to the specified temperature if in heating mode. Only the case of the cooling mode will be explained below.

The supply air that is blown out by the air conditioner 401 passes through a duct 406 and is supplied to the individual zones 405-1 through 405-4 from blowing vents 407-1 through 407-4. The supply air temperature is measured by a supply air temperature sensor 404. Supply air dampers 402-1 through 402-4 adjust the flow rates of the air that is supplied to the individual zones 405-1 through 405-4 in response to operating variables MV_A1 through MV_A4 that are outputted from the primary controlling portions 1-1 through 1-4. The air conditioner 401 adjusts the supply air temperature through adjusting the volume of a heat transfer medium that flows through a heat exchanging device within the air conditioner according to the adjustment operating variable MV_BS that is outputted from the operating variable adjustment controlling portion 3. Return air that is returned from the room 400 passes through a duct 408 and a return air damper 409, to be mixed with outside air that is introduced from an inlet 410, and is returned to the air conditioner 401. The minimum required operating variables MV_A1 through MV_A4 (flow rates) that can be controlled by the primary control systems go to the operating variable setting value SP_BS, that is, to the equilibrium point for that which is adjusted. The operating variable setting value SP_BS is, for example, 10 mm³/min.

In order to increase the operating variables MV_A1 through MV_A4 of the primary control systems it is necessary to increase the supply air temperature that is the adjustment operating variable MV_BS, and, conversely, in order to decrease the operating variables MV_A1 through MV_A4 of the primary control systems it is necessary to decrease the supply air temperature that is the adjustment operating variable MV_BS. Consequently, control calculations for reverse actions are applied to the adjustment controlling calculating portion 32 for the operating variable adjustment controlling portion 3. Typically, the conveyance power can be reduced by reducing the air flow rate, so this is known to tie into energy conservation.

In the four primary control systems, the one that is in the most disadvantageous state of control is the one that shows the minimum value of the operating variables MV_A1 through MV_A4. Consequently, the selector 2 should select, and output as the combined operating variable MV_AS, the smallest value from among the four operating variables MV_A1 through MV_A4. However, if necessary in control performance, instead the weightings $\alpha j$ and $\beta i$ may be adjusted as appropriate.

In the case of air-conditioning, the heat dissipating conditions will vary depending on whether or not there are heat-emitting objects such as people or computers in the individual zones 405-1 through 405-4, or whether or not there are windows in the individual zones 405-1 through 405-4, so that, as a result, there is a high probability that the operating variables MV_A1 through MV_A4 will have extremely different numbers in different zones. Given this, rather than focusing the weightings on the minimum value of the operating variables MV_A1 through MV_A4, the method of varying the weightings $\beta i$, shown in Equation (3), which are linked to the quantitative values of the operating variables MV_A1 through MV_A4 is preferred. Specifically, if the operating variables MV_Ai (wherein i=1 through 4) can assume numeric values from 0% through 100%, values such as a weighting $\beta i$ of 3.0 can be applied to an operating variable MV_Ai in the range of 0% through 19.9%, a weighting $\beta i$ of 2.5 can be applied to an operating variable MV_Ai in the range of 20.0% through 39.9%, a weighting $\beta i$ of 2.0 can be applied to an operating variable MV_Ai in the range of 40.0% through 59.9%, a weighting $\beta i$ of 1.5 can be applied to an operating variable MV_Ai in the range of 60.0% through 79.9%, and a weighting $\beta i$ of 1.0 can be applied to an operating variable MV_Ai in the range of 80.0% through 100.0%.

The integrating time TI_B that is set in the adjustment controlling calculating portion 32 of the operating variable adjustment controlling portion 3 is set so as to be no less than the maximum value TI_Amax of the integrating times TI_Ai that are set in the control calculating portions 12-i of the four primary controlling portions 1-i (where i is 1 through 4). Moreover, the differentiating time TD_B that is set in the adjustment controlling calculating portion 32 is set so as to be no more than the smallest TD_Amin among the differentiating times TD_Ai that are set in the control calculating portions 12-i of the primary controlling portions 1-i.

Note that with the cooperative operating device according to the present example, preferably there is a structure that is provided with a controlling portion (not shown) for controlling the supply air temperature, which is a state variable that has a direct influence on the equilibrium point. Specifically, when the supply air temperature is greater than a specific upper limit value, the controlling portion limits the adjustment operating variable MV_BS so as to not decrease, and, conversely, when the supply air temperature is less than a specific lower limit value, the controlling portion limits the adjustment operating variable MV_BS so as to not increase. That is, the controlling portion controls the adjustment operating variable MV_BS so that the supply air temperature will not rise above an upper limit value and will not fall below a lower limit value.

Another Further Example

Figure 9:
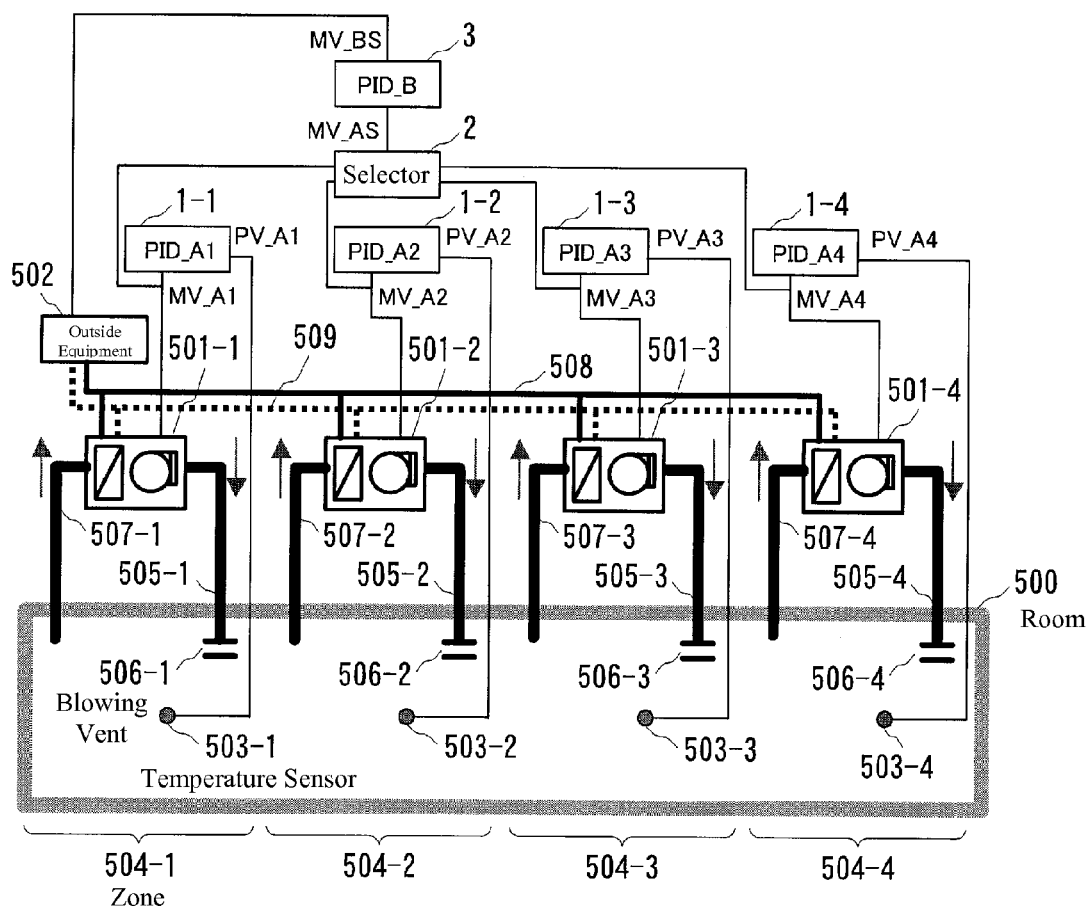
FIG. 9 is a block diagram illustrating a configuration of a building multiple air-conditioning system according to Another Further Example according to the present invention.
Figure 10:
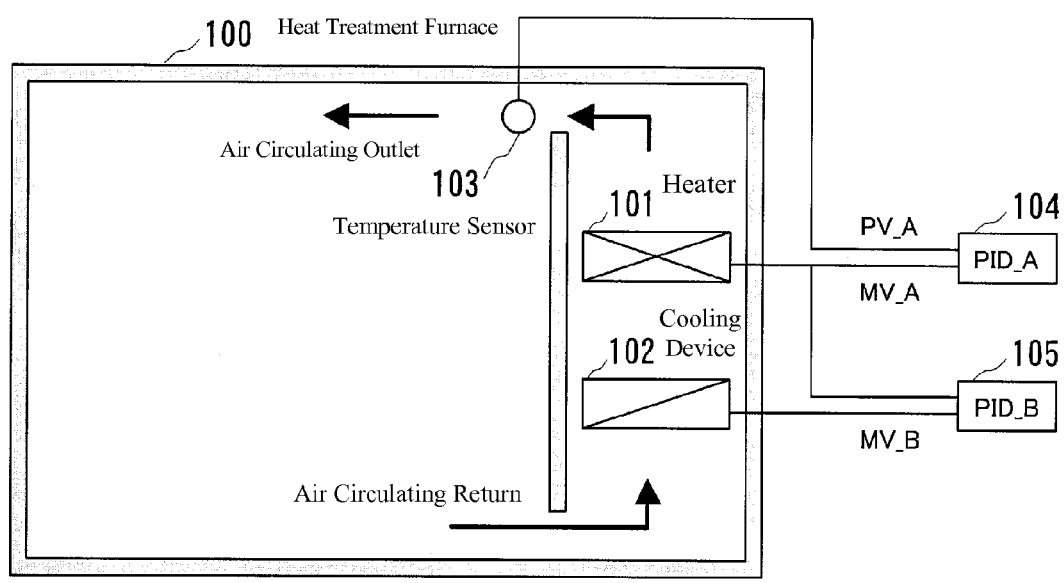
FIG. 10 is a diagram illustrating an example of application of a conventional controlling device to temperature control of a heat treatment furnace.
Figure 11:
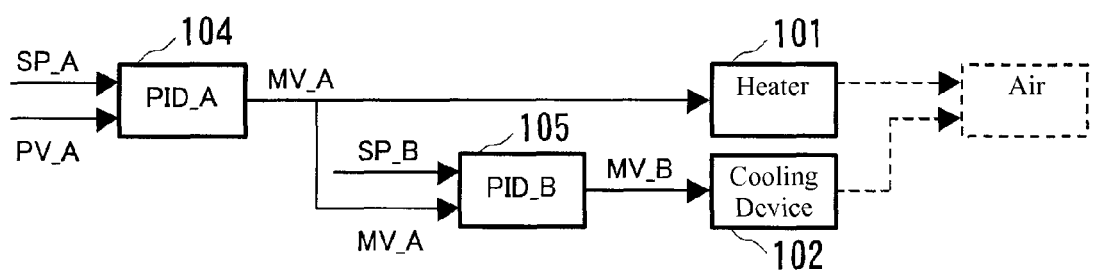
FIG. 11 is a block diagram illustrating a configuration for a conventional controlling device.

Another Further Example according to the present invention will be explained next. FIG. 9 is a block diagram illustrating a configuration of a building multi-air-conditioning system according to the Another Further Example according to the present invention. The present example is to illustrate an example wherein the cooperative operating device of the Example is applied to a building multi-air-conditioning system that is structured with a supply air temperature control system that is four primary control systems and a heat exchanging medium temperature control system that is a single secondary control system. A room 500 has four zones 504-1 through 504-4 for which the temperature is to be controlled, where air-conditioners 501-1 through 501-4 (supply air temperature actuators) are provided for the individual zones 504-1 through 504-4. Outdoor equipment 502 structure the heat exchanging medium temperature actuator of the secondary control system.

The primary controlling portions 1-1 through 1-4 perform room temperature control through the supply air temperatures to the individual zones 504-1 through 504-4. The temperatures PV_A1 through PV_A4 (controlled variables) of the individual zones 504-1 through 504-4 are measured individually by temperature sensors 503-1 through 503-4. Outdoor equipment 502 that is shared by the four air-conditioners 501-1 through 501-4 cools the heat exchanging medium to a specified temperature if in cooling mode, and heats the heat exchanging medium the specified temperature if in heating mode. Only the case of the cooling mode will be explained below.

The outdoor equipment 502 adjusts the heat transfer medium temperature through adjusting the volume of a heat transfer medium that flows through a heat exchanging device within the outdoor equipment according to the adjustment operating variable MV_BS that is outputted from the operating variable adjustment controlling portion 3. The heat exchanging medium that is cooled by the outdoor equipment 502 is supplied through a pipe 508 to the individual air-conditioners 501-1 through 501-4. The heat exchanging medium that is used is returned to the outdoor equipment 502 through a pipe 509. The air conditioners 501-1 through 501-4 adjust the supply air temperature through adjusting the volume of a heat transfer medium that flows through a heat exchanging device within the air conditioner according to the adjustment operating variables MV_A1 through MV_A4 that are outputted from the primary controlling portions 1-1 through 1-4. The supply air that is blown out by the air conditioners 501-1 through 501-4 passes through ducts 505-1 through 505-4 and is supplied to the individual zones 504-1 through 504-4 from blowing vents 506-1 through 506-4. Return air that is returned from the room 500 passes through ducts 507-1 though 507-4 and is returned to the air conditioners 501-1 though 501-4. The minimum required operating variables MV_A1 through MV_A4 (heat exchanging medium valve openings) that can be controlled by the primary control systems go to the operating variable setting value SP_BS, that is, to the equilibrium point for that which is adjusted. The operating variable setting value SP_BS is, for example, 20%.

In order to increase the operating variables MV_A1 through MV_A4 of the primary control systems it is necessary to increase the coolant temperature that is the adjustment operating variable MV_BS, and, conversely, in order to decrease the operating variables MV_A1 through MV_A4 of the primary control systems it is necessary to decrease the coolant temperature that is the adjustment operating variable MV_BS. Consequently, control calculations for reverse actions are applied to the adjustment controlling calculating portion 32 for the operating variable adjustment controlling portion 3. Depending on the type of outdoor equipment 502, the conveyance power can be reduced by reducing the heat exchanging medium flow rate, so this is known to tie into energy conservation.

In the four primary control systems, the one that is in the most disadvantageous state of control is the one that shows the minimum value of the operating variables MV_A1 through MV_A4. Consequently, the selector 2 should select, and output as the combined operating variable MV_AS, the smallest value from among the four operating variables MV_A1 through MV_A4. However, if necessary in control performance, instead the weightings $\alpha j$ and $\beta i$ may be adjusted as appropriate.

In the case of air-conditioning, the heat dissipating conditions will vary depending on whether or not there are heat-emitting objects such as people or computers in the individual zones 504-1 through 504-4, or whether or not there are windows in the individual zones 504-1 through 504-4, so that, as a result, there is a high probability that the operating variables MV_A1 through MV_A4 will have extremely different numbers in different zones. Given this, rather than focusing the weightings on the minimum value of the operating variables MV_A1 through MV_A4, the method of varying the weightings $\beta i$, shown in Equation (3), which are linked to the quantitative values of the operating variables MV_A1 through MV_A4 is preferred. Specifically, if the operating variables MV_Ai (wherein i=1 through 4) can assume numeric values from 0% through 100%, values such as a weighting $\beta i$ of 3.0 can be applied to an operating variable MV_Ai in the range of 0% through 19.9%, a weighting $\beta i$ of 2.5 can be applied to an operating variable MV_Ai in the range of 20.0% through 39.9%, a weighting $\beta i$ of 2.0 can be applied to an operating variable MV_Ai in the range of 40.0% through 59.9%, a weighting $\beta i$ of 1.5 can be applied to an operating variable MV_Ai in the range of 60.0% through 79.9%, and a weighting $\beta i$ of 1.0 can be applied to an operating variable MV_Ai in the range of 80.0% through 100.0%.

The integrating time TI_B that is set in the adjustment controlling calculating portion 32 of the operating variable adjustment controlling portion 3 is set so as to be no less than the maximum value TI_Amax of the integrating times TI_Ai that are set in the control calculating portions 12-$i$ of the four primary controlling portions 1-$i$ (where i is 1 through 4). Moreover, the differentiating time TD_B that is set in the adjustment controlling calculating portion 32 is set so as to be no more than the smallest TD_Amin among the differentiating times TD_Ai that are set in the control calculating portions 12-$i$ of the primary controlling portions 1-$i$.

Note that in a building multiple air-conditioning system, a combination of operating variables that result in trade-offs enable appropriate designs other than that which is set forth above depending on the functions that are provided in the air conditioners 501-1 through 501-4 and the outdoor equipment 402. Moreover, with the cooperative operating device according to the present example, preferably there is a structure that is provided with a controlling portion (not shown) for controlling the heat exchanging medium temperature, which is a state variable that has a direct influence on the equilibrium point. Specifically, when the heat exchanging medium temperature is greater than a specific upper limit value, the controlling portion limits the adjustment operating variable MV_BS so as to not decrease, and, conversely, when the heat exchanging medium temperature is less than a specific lower limit value, the controlling portion limits the adjustment operating variable MV_BS so as to not increase. That is, the controlling portion controls the adjustment operating variable MV_BS so that the heat exchanging medium temperature will not rise above an upper limit value and will not fall below a lower limit value.

The cooperative operating devices explained in the Example, Another Example, Yet Another Example, Further Example, and Another Further Example, may be embodied through a computer that is equipped with a CPU, a storage device, and an interface, combined with a program for controlling these hardware resources. The CPU executes the processes explained in the Example, Another Example, Yet Another Example, Further Example, and Another Further Example, in accordance with a program that is stored in the memory device.

The present invention can be applied to multi-loop controlling systems. In particular, the present invention can be applied to systems wherein there is a plurality of primary control systems, and a shared equilibrium point to which they should each be adjusted.

Obviously, numerous modifications and variations of the present invention are possible in light of the above teachings. It is therefore to be understood that within the scope of the appended claims, the invention may be practiced otherwise than as specifically described herein.

The invention claimed is:
1. A cooperative operating device in a multi-loop control system, comprising:
a plurality of primary control systems, comprising:

a plurality of control variable inputting units that are provided to correspond to the plurality of primary control systems, and providing individual controlled variables;

a plurality of first control calculating units that are provided to correspond to the plurality of primary control systems, input setting values for primary control and the controlled variables for primary control, and calculate first operating variables through control calculations;

a plurality of first operating variable outputting units that are provided for each primary control system, and output to an actuator of the corresponding primary control system, the first operating variable calculated by the first control calculating unit of the corresponding primary control system;

a combining unit that combines the plurality of first operating variables through performing a weighting calculation on the plurality of first operating variables calculated by the plurality of first control calculating units, to output a second operating variable; and a single secondary control system, comprising:
a second control calculating unit that is provided to correspond to the single secondary control system controlling an equilibrium point that is a desirable operating variable output with the primary control in a steady state, inputs a specific operating variable setting value that indicates the equilibrium point, and, using the second operating variable that is outputted by the combining unit as a controlled variable input, calculates a third operating variable through a control calculation; and a second operating variable outputting unit that outputs, to an actuator of the secondary control system, the third operating variable calculated by the second control calculating unit wherein: the control calculations performed by the first control calculating unit and the second control calculating unit are PID control calculations; and an integrating time, which is a PID parameter that is set in advance in the second control calculating unit, is a value that is more than any of the integrating times that are set in advance in the first control calculating units.

2. The cooperative operating device as set forth in claim 1, wherein:
a differentiating time, which is a PID parameter that is set in advance in the second control calculating unit, is a value that is no more than any of the differentiating times that are set in advance in the first control calculating units.

3. The cooperative operating device as set forth in claim 1, wherein:
the cooperative operating device further comprises
an integrating time limiter that limits the integrating time, which is a PID parameter that is set in the second control calculating unit, to a value that is no less than any of the integrating times that are set in advance in the first control calculating units.

4. The cooperative operating device as set forth in claim 1, wherein:
the cooperative operating device further comprises a differentiating time limiter that limits the differentiating time, which is a PID parameter that is set in the second control calculating unit, to a value that is no more than any of the differentiating times that are set in advance in the first control calculating units.

5. The cooperative operating device as set forth in claim 1, wherein:
the weighting in the weighting calculation performed by the combining unit is variable weighting linked to the quantitative values of the first operating variables.

6. The cooperative operating device as set forth in claim 1, further comprising:
a controlling unit that monitors state variables that affect the equilibrium point directly, and applies a limitation to the operation of the third operating variables.

7. A cooperative operating device comprising:
a plurality of first control calculating units corresponding to a plurality of primary control systems, input setting values for primary control and controlled variables for primary control, and calculating first operating variables through control calculations;

a plurality of first operating variable outputting units that are provided for each primary control system, and output to an actuator of the corresponding primary control system, the first operating variable calculated by the first control calculating unit of the corresponding primary control system;

a combining unit combining the plurality of first operating variables through performing a weighting calculation on the plurality of first operating variables calculated by the plurality of first control calculating units, to output a second operating variable;

a second control calculating unit corresponding to a single secondary control system controlling an equilibrium point that is a desirable operating variable output with the primary control in a steady state, inputs a specific operating variable setting value that indicates the equilibrium point, and, using the second operating variable that is outputted by the combining unit as a controlled variable input, calculates a third operating variable through a control calculation;

a second operating variable outputting unit that outputs, to an actuator of the secondary control system, the third operating variable calculated by the second control calculating unit; and an ordering unit that records in ascending or descending order the plurality of first operating variables calculated by the plurality of first control calculating units;

wherein the combining unit combines the plurality of first operating variables through performing a weighting calculation on the plurality of first operating variables that have been reordered by the ordering unit wherein: the control calculations performed by the first control calculating unit and the second control calculating unit are PID control calculations; and an integrating time, which is a PID parameter that is set in advance in the second control calculating unit, is a value that is more than any of the integrating times that are set in advance in the first control calculating units.

8. The cooperative operating device as set forth in claim 7, wherein:
the combining unit performs a weighting operation for selecting a minimum value or a maximum value of the first operating variables.

9. A cooperative operating method in a multi-loop control system, comprising:
a control variable inputting step inputting individual controlled variables;
a first control calculating step inputting setting values for primary control and receiving the controlled variables for primary control and calculating first operating variables through control calculations;

a first operating variable outputting step outputting, to actuators of the respective corresponding primary control systems, a plurality of first operating variables calculated in the first control calculating step;

a combining step combining the plurality of first operating variables through performing a weighting calculation on the plurality of first operating variables calculated in the first control calculating step, to obtain a second operating variable;

a second control calculating step inputting a specific operating variable setting value that indicates an equilibrium point that is a desirable operating variable output with the primary control in a steady state, and using the second operating variable that is obtained by the combining step as a controlled variable input, to calculate a third operating variable through a control calculation; and a second operating variable outputting step outputting, to an actuator of a single secondary control system for adjusting the equilibrium point, a third operating variable calculated in the second control calculating step wherein: the control calculations performed in the first control calculating step and the second control calculating step are PID control calculations; and an integrating time, which is a PID parameter that is used in the second control calculating step, is a value that is more than any of the integrating times used in the first control calculating step.

10. The cooperative operating method as set forth in claim 9, wherein:

a differentiating time, which is a PID parameter that is used in the second control calculating step, is a value that is no more than any of the differentiating times used in the first control calculating step.

11. The cooperative operating method as set forth in claim 9, wherein:

an integrating time limiting step for limiting an integrating time, which is a PID parameter that is used in the second control calculating step, to a value that is no less than any of the integrating times used in the first control calculating step is further included.

12. The cooperative operating method as set forth in claim 9, wherein:

a differentiating time limiting step for limiting a differentiating time, which is a PID parameter that is used in the second control calculating step, to a value that is no more than any of the differentiating times used in the first control calculating step is further included.

13. The cooperative operating method as set forth in claim 9, wherein:

the weighting in the weighting calculation performed in the combining step is variable weighting linked to the quantitative values of the first operating variables.

14. The cooperative operating method as set forth in claim 9, further comprising:

a controlling step for monitoring state variables that affect the equilibrium point directly, and for applying a limitation to the operation of the third operating variables.

15. A cooperative operating method comprising:

a first control calculating step inputting setting values for primary control and controlled variables for primary control and calculating first operating variables through control calculations;

a first operating variable outputting step outputting, to actuators of the respective corresponding primary control systems, a plurality of first operating variables calculated in the first control calculating step;

a combining step combining the plurality of first operating variables through performing a weighting calculation on the plurality of first operating variables calculated in the first control calculating step, to obtain a second operating variable;

a second control calculating step inputting a specific operating variable setting value that indicates an equilibrium point that is a desirable operating variable output with the primary control in a steady state, and using the second operating variable that is obtained by the combining step as a controlled variable input, to calculate a third operating variable through a control calculation;

a second operating variable outputting step for outputting, to an actuator of a single secondary control system for adjusting the equilibrium point, a third operating variable calculated in the second control calculating step; and an ordering step for reordering in ascending or descending order the plurality of first operating variables calculated in the first control calculating step;

wherein the combining step combines the plurality of first operating variables through performing a weighting calculation on the plurality of first operating variables that have been reordered by the ordering step wherein: the control calculations performed in the first control calculating step and the second control calculating step are PID control calculations; and an integrating time, which is a PID parameter that is used in the second control calculating step, is a value that is more than any of the integrating times used in the first control calculating step.

16. The cooperative operating method as set forth in claim 15, wherein:

the combining step performs a weighting operation for selecting a minimum value or a maximum value of the first operating variables.

\* \* \* \* \*